Sept. 1, 1964  T. P. AVERY  3,147,220
FILTER

Filed July 18, 1960  2 Sheets-Sheet 1

INVENTOR
Theodore P. Avery

BY Mason, Fenwick & Lawrence
ATTORNEYS

Sept. 1, 1964  T. P. AVERY  3,147,220
FILTER
Filed July 18, 1960  2 Sheets-Sheet 2

INVENTOR
*Theodore P. Avery*

BY *Mason, Fenwick & Lawrence*
ATTORNEYS

United States Patent Office 3,147,220
Patented Sept. 1, 1964

3,147,220
FILTER
Theodore P. Avery, 44 Seneca St., Oil City, Pa.
Filed July 18, 1960, Ser. No. 43,624
6 Claims. (Cl. 210—315)

This invention relates to filters, and particularly to improved filters for use in continuously operating filtering systems.

In restaurants, and other places where food is prepared in quantity and continuously over long periods of time, deep fat frying is accomplished by immersion of the foods in large bodies of fat held in fry kettles. The fat is heated at the opening of the business day and it is continued in use throughout the day. The same body of fat is maintained in use as long as possible, and new fat is added as required. Due to decomposition and the accumulation of foreign material in the body of fat, the fat, after a short period of use, will change color, acquire an odor of rancidity and transmit the odor to foods being fried. It has been found that if the foreign matter and products of decomposition are removed, the usable life of the body of fat is appreciably lengthened. To this end, systems have been devised, and are in use, which draw fat from a fry kettle in use, filter it and return it to the kettle in a continuous cycle.

It is the general object of the present invention to provide an improved filter for use in such systems, as well as in other continuous filtering systems.

A more specific object of the invention is to provide a frying fat filter which is of simplified construction, and can be disassembled for cleaning and re-assembled with ease and speed.

Another object of the invention is the provision of a filter of this nature which will permit improved circulation of the fat through the filter, a more even pick up of filter aid and better distribution of the filter aid over the filter cloth.

A further object is the provision of means to allow fat flow directly into the filter without back splash, or undue turbulence.

Yet another object is to provide a filter having means to strain out solids immediately upon entry of the fat into the filter and before it reaches the filtering surface.

Other objects of the invention will become apparent from the following description of practical embodiments thereof, when taken in conjunction with the drawings which accompany, and form part of, this specification.

Figure 1:
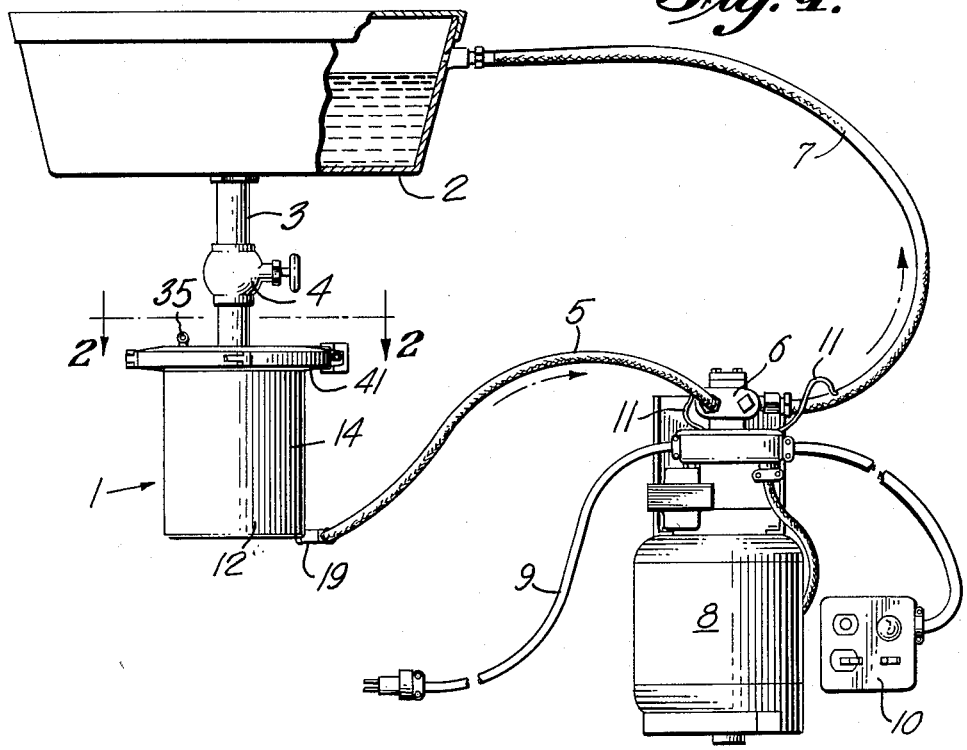
FIGURE 1 shows a filter incorporating the principles of the present invention connected to a fry kettle and included in a continuous fat circulation system.
Figure 2:
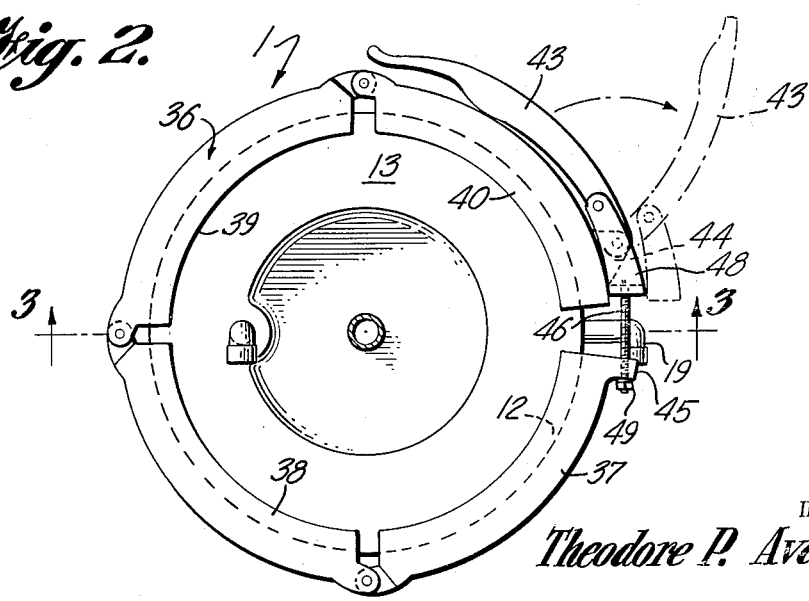
FIGURE 2 is a section taken on the line 2—2 of FIGURE 1, illustrating the improved filter in top plan.
Figure 3:
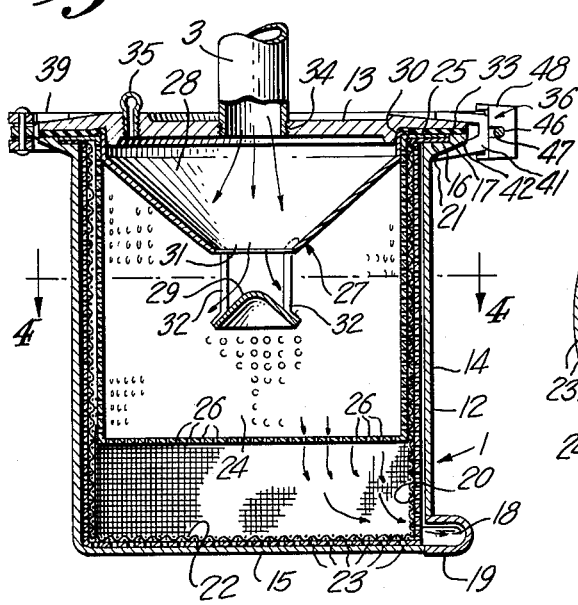
FIGURE 3 is a vertical section through the filter, and is taken on the line 3—3 of FIGURE 2.
Figure 4:
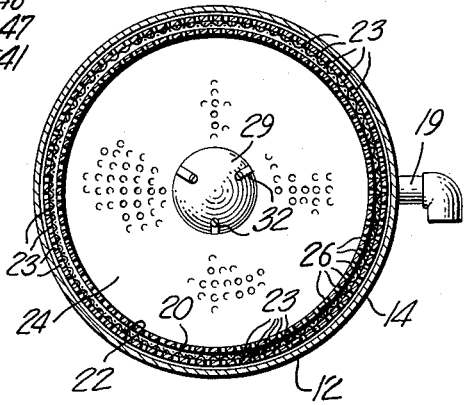
FIGURE 4 is a horizontal section taken on the line 4—4 of FIGURE 3.

Referring first to FIGURE 1, there is shown a filter 1 incorporated in a circulation system to and from a deep fat fry kettle 2. The system includes a pipe 3 from the kettle 2 to the top of the filter through which fat may flow from the kettle to the filter. A valve 4 is included in the line so that the line may be shut off when it is not desired to use the filter. An outlet in the base of the filter is connected through tube 5 with a pump 6, and the pump is connected through tube 7 with the fry kettle above the fat level in the kettle. Through this arrangement, fat in the kettle may flow through pipe 3 into the filter where impurities will be removed, and then be pumped through tubing lines 5 and 7 back to the kettle for re-use. Pump 6 is operated by a motor 8. The unit has an electric cord 9 for connection to a suitable current outlet, and may include a control box 10 with necessary switches, instruments, etc. The tubes which carry the fat are provided with electrical heating elements, indicated at 11, so that fat within the tubes may be liquefied before starting the pump. This general arrangement is known in the art, and is briefly described to point out the filter position in use so that the improved filter structure may be more clearly understood. This is illustrative of any filtering system.

The filter 1 is housed within a filter can 12 having a cover 13. The can is cylindrical, having side walls 14 and closed bottom 15 and is open at the top. The can has an out-turned flange 16 extending about the open top, and the flange has an annular recessed seat 17 about its inner edge. There is an outlet opening 18 at the bottom of the can which extends into a fitting 19 to which the tube line 5 is coupled.

Inside the filter can there is a stainless steel perforated basket 22. The basket is of sufficiently less diameter than the can so that when the basket is in the can there will be an annular space between the can and basket. The basket is the full depth of the can and perforated, as at 23, over its entire surface. The perforations are close together and large enough to allow free flow of fat through the basket walls.

A filter bag 20 is placed within the basket. The bag slips easily into the basket and extends its full depth. The bag has a rim 21, of paper, or other gasket material, fixed to its top edge, and the rim fits in the seat 17 in the filter can rim. The bag may be made of any suitable filter cloth upon which a coating of filter aid can build up and through which the fat, or oil, can filter.

Within the bag, there is a stainless steel, perforated container 24, which serves as both a filter aid chamber and a crumb catcher. Container 24 is of considerably less diameter than basket 22, so that there is an annular space between the walls of the container and the bag when the container is in position, within, and concentric to, the basket. The container is much shorter than the bag, leaving a relatively large area between the bottom of the container and the bottom of the bag. The container is held in place by means of a flange 25 which encircles the top of the container and rests in the seat 17 of the can on top of the bag rim 21. The outer diameter of the container flange 25 is just slightly less than the outer diameter of the recessed seat so that the flange may drop freely into the seat but can have no appreciable movement laterally of the seat. The perforations 26 in the container 24 will be large enough to permit free flow of the fat and filter aid powder out of the container while retaining crumbs and other particle size foreign matter within the container.

Held within the mouth of the container 24 is a baffle 27, which directs the flow of incoming fat towards the sides of the container 24, providing for even distribution of the fat within the container and preventing back splash into the entering stream. The baffle has two joined parts, an upper, funnel-like receiver 28 and a lower conical stream divider 29. The receiver has a curled upper wall 30 to hook over the upper edge of the container 24, and its lower walls taper inwardly to a central opening 31 which provides an outlet from the receiver. The lower conical divider is positioned directly below the outlet 31, and axially aligned with it. The base of the cone is larger than the outlet 31 so that all material flowing out of the outlet will impinge upon the cone. The two members are held in vertically spaced relation by three straps 32, which have their upper ends welded to the receiver underside around the outlet and their lower ends welded to the cone adjacent its base.

The can cover 13 fits over the entire assembly, with its outer edge overlying the annular flange 16 of the can and flush with the flange edge. A suitable gasket 33 is interposed between the can flange and lid to assure a tight seal. The cover has a central opening 34, into which pipe 3 is connected to provide for flow of fat from the fat kettle into the filter. An air vent 35 is also provided in the cover to freely admit air to the interior of the filter to prevent the creation of vacuum, or air locks in the filter and to allow the free escape of air as the filter fills with fat, or oil.

The cover is held in position on the can and locked to it by means of a hinged locking rim 36. The locking rim is made up of four arcuate sections 37, 38, 39 and 40, which are hinged together so that they may be placed about the peripheral edges of the can flange and cover. Each section is channel shaped, and adapted to embrace the overlying edges of the can flange and cover. The lower leg 41 of the locking rim sections is tapered so as to provide an inclined surface 42 to wedge the cover and can flange tightly together. After the sections are placed in surrounding relation to the cover and flange, they are drawn into tight engagement with them by means of a locking handle 43 which is pivotally attached to an ear 44 carried adjacent the free end of the rim section 40. The free end of section 37 has an outturned lug 45 which is apertured to receive an adjustable link bolt 46. The head of the bolt is adapted to be received in a notch 47 in the end of a bail 48, pivotally connected to the locking handle 43 at a distance from the pivotal point of the handle. A nut 49 on the end of the bolt permits adjustment to vary the effective length of the bolt link to change the closure force on the cover.

In using the device, the filter will be connected into the system as described, and, with the cover baffle removed from the can, filter aid, such as diatomaceous earth, is deposited in the container 24. The baffle is then replaced with its lip overhanging the edge of the container 24. The gasket 33 is put into position, and the cover replaced. The locking rim is then put around the cover, engaging both the cover and the can flange. The bolt head is slipped into the notch 47 in the bail and the handle pushed back to lie along side the rim section 40. This will draw in on the rim sections, forcing the cover and can flange into sealing relation.

When the filter is ready for operation, the fat in the kettle will be heated and the heating elements will be turned on to liquefy the fat in the tube lines and pump. After proper heating, the valve 4 will be opened to start flow of the fat to the filter, and the pump will be put into operation. As the fat flows by gravity through pipe 3, it will enter the filter through the center opening 34 in the cover. Much of the fat will fall directly through the opening 34 onto the conical divider 29, which will spread the fat and cause it to fall in a conical shower into the container 24. This causes the fat to fall gently around the circumference of the container bottom and effectively prevents backsplash. Any fat which which falls into the receiver beyond the periphery of the central opening will flow down the sloping walls of the receiver to the opening. The fat within the container will pick up the powdered filter aid and flow through the perforations in the container into the bag 20. In so doing, crumbs and other particles of foreign matter will be strained out of the material and be retained in the container. The fat will flow through the container walls and be filtered through bag 20. The filter aid carried to the bag in the fat will build up very quickly into an effective filter coat, and a supply of fresh filter aid is brought to the bag wall by the incoming fat. The basket forms an effective retainer wall to hold the bag against outward strain. After seeping through the filter cloth, the clean, clear fat will be drawn out of the can through outlet 18 and tube line 5 to the pump. From the pump, the fat will be forced back to the fry kettle.

By using the container 24, the baffle 27 and an air vent in the cover, the inflow of fat will be smooth, and free from splashing and turbulence. There will be no vacuum or air pressure to interfere with the smooth flow. The container 24 will function as a strainer so that much of the larger particles will be strained from the material and the filter cloth will remain clean and effective for longer periods of time. The particular manner of spreading the entering fat through use of the container will result in a more even pick up of filter aid.

Figure 5:
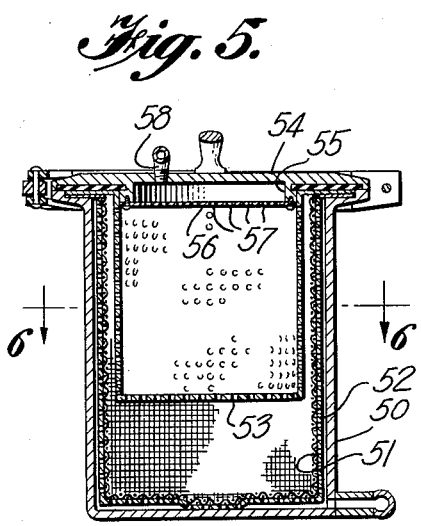
FIGURE 5 is a vertical section through a filter of slightly modified structure.
Figure 6:
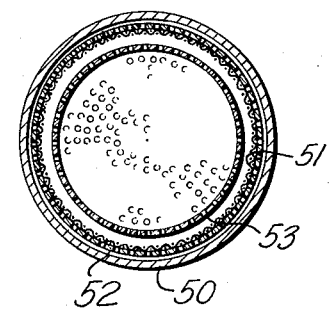
FIGURE 6 is a horizontal section taken on the line 6—6 of FIGURE 5.

In FIGURES 5 and 6, there is shown a slight modification of the filter structure. In this form the can 50, filter bag 51, basket 52 and filter aid container and fat strainer 53 are the same as before. The baffle formerly used is not used, but the cover 54 is of modified construction.

The cover in this form has a downwardly projecting annular rib 55 over which there is a closure plate 56. The closure plate has a plurality of openings 57 spaced over its area. When fat enters through inlet 58 it will impinge upon the closure plate 56 and spread over the plate within the receiving chamber formed by the rib 55 and plate 56. The fat will flow evenly through opening 57 into the container 53. This arrangement is simpler than the one first described, and is particularly adapted to smaller scale installations.

While in the above practical embodiments of the invention have been disclosed, it will be understood that the precise details of construction shown and described are merely by way of illustration, and the invention may take other forms within the scope of the appended claims.

What is claimed is:

1. A filter comprising a can having an open top and an outlet at the bottom, the can having a peripheral flange about its open end with an annular recessed seat therein adjacent the juncture of the can side wall with the flange, a basket removably seated in the can having perforated bottom and side walls and extending substantially the full depth of the can, leaving a space between the bottom wall of the basket and the bottom wall of the can, to permit the flow of fluid therebetween, the basket being spaced from the can wall to provide an annular space between the can wall and basket wall, the basket having projecting means at the bottom to rest upon the can bottom to hold the basket bottom spaced from the can bottom, a filter bag within the basket closely fitting the interior of the basket whereby the basket forms a protective casing around the bag to support the bag during internal pressure, the bag having a peripheral flange at its top fitting in the annular recessed seat in the can flange, a perforated container having an open top and a peripheral flange seated upon the flange of the filter bag within the annular recessed seat in the can flange to position the container within the bag with its side and bottom walls all spaced from the bag to serve as a container for filter aid material and a crumb catcher, the filtering openings in the filter bag being smaller than those of the basket and container, a cover seated on the can flange overlying the can, perforated container and filter bag flanges and having an inlet therein adapted to empty into the can within the periphery of the perforated container, a baffle within the open top of the can and beneath the inlet in the cover, the baffle comprising a receiver having an open top and side walls converging downwardly to a central outlet opening and a diffuser carried in depending relation by the receiver beneath the outlet opening in the receiver to spread material flowing out of the receiver outlet to the sides of the container, the receiver having a peripheral lip seated upon the peripheral flange of the container and means to releasably clamp the cover to the can flange in sealing relation.

2. A filter as claimed in claim 1 wherein there is a baffle within the open top of the container and beneath the inlet in the cover, the baffle comprising a receiver having an open top and side walls converging downwardly to a central outlet opening and a diffuser carried in depending relation by the receiver beneath the outlet opening in the receiver to spread material flowing out of the receiver outlet to the sides of the container, the receiver having a peripheral lip seated upon the peripheral flange of the container.

3. A filter as claimed in claim 2 wherein the outlet opening in the receiver is in vertical alignment with the inlet in the cover, and the diffuser is a cone having a vertical axis which is coaxial with the receiver outlet opening.

4. A filter comprising, a cylindrical can having an open top and an outlet through the sidewall of the can at the bottom, the can having a peripheral flange about the open end with an annular seat therein adjacent the juncture of the can sidewall with the flange, a cylindrical basket having perforated side and bottom walls and an open top seated within the can and spaced from the can walls to provide an annular space between the can and basket, a filter bag having an open mouth lining the basket, the bag having a rim about its mouth lying in the annular seat in the can flange, a container of smaller diameter and length than the basket and having a peripheral flange lying in the annular seat to position the container concentrically to the basket and can with its side and bottom walls spaced from the side and bottom walls of the bag, a baffle having a receiver and a diffuser depending from the receiver mounted about the open end of the container to hang within the container centrally thereof, the receiver having an open top and side walls converging downwardly to a central outlet opening, the diffuser being a cone having a vertical axis in alignment with the center of the receiver outlet opening, the receiver having a peripheral lip seated upon the peripheral flange of the container, a cover for sealing contact with the can flange and having an inlet for material to be filtered in vertical alignment with the receiver outlet opening, and means for releasably holding the cover fixed to the can flange in sealing relation.

5. A filter as claimed in claim 4 wherein there is an air vent in the cover.

6. A filter as claimed in claim 4 wherein the means to hold the cover upon the can flange comprises a rim having a plurality of arcuate sections of U-shaped cross-section hingedly connected together to encompass the peripheral edges of the cover and can flange, and a toggle interposed in the rim for drawing the plurality of sections into binding engagement with the cover and can flange.

References Cited in the file of this patent

UNITED STATES PATENTS

| | | |
|---|---|---|
| 540,940 | Baughman | June 11, 1895 |
| 1,065,992 | Wheelock | July 1, 1913 |
| 1,563,904 | Kearckhoff et al. | Dec. 1, 1925 |
| 1,602,343 | Duerr et al. | Oct. 5, 1926 |
| 1,810,965 | Hopkins | June 23, 1931 |
| 2,066,364 | Rafton | Jan. 6, 1937 |
| 2,100,951 | Glass et al. | Nov. 30, 1937 |
| 2,133,004 | Williams | Oct. 11, 1938 |
| 2,633,990 | Simpson | Apr. 7, 1953 |
| 2,727,634 | O'Meara | Dec. 20, 1955 |

FOREIGN PATENTS

| | | |
|---|---|---|
| 185,925 | Great Britain | Sept. 21, 1922 |